United States Patent
Manuel-Devadoss

(10) Patent No.: US 8,238,602 B2
(45) Date of Patent: Aug. 7, 2012

(54) METHOD AND SYSTEM FOR TRACKING AND PROCESSING ITEMS IN PERSONAL MAILBOX

(76) Inventor: Johnson Manuel-Devadoss, Chennai (IN)

( * ) Notice: Subject to any disclaimer, the term of this patent is extended or adjusted under 35 U.S.C. 154(b) by 476 days.

(21) Appl. No.: 12/640,879

(22) Filed: Dec. 17, 2009

(65) Prior Publication Data

US 2010/0111357 A1    May 6, 2010

(51) Int. Cl.
*G06K 9/00* (2006.01)
(52) U.S. Cl. .................... 382/101; 382/153
(58) Field of Classification Search .......... 382/101, 382/153; 414/795.6; 209/584, 539; 198/444
See application file for complete search history.

(56) References Cited

U.S. PATENT DOCUMENTS

| | | | | |
|---|---|---|---|---|
| 4,634,328 A * | 1/1987 | Carrell | ............ | 198/444 |
| 6,026,967 A * | 2/2000 | Isaacs et al. | ............ | 209/539 |
| 7,138,596 B2 * | 11/2006 | Pippin et al. | ............ | 209/584 |
| 7,381,026 B1 * | 6/2008 | Power et al. | ............ | 414/795.6 |
| 7,442,896 B2 * | 10/2008 | Ehrat et al. | ............ | 209/584 |
| 7,960,668 B2 * | 6/2011 | Fethke et al. | ............ | 209/584 |

* cited by examiner

*Primary Examiner* — Claire X Wang

(57) ABSTRACT

The present invention discloses a method and system to track and process the received postal items in their personal mailbox. The present invention resides inside the personal mailbox of a user. When mail item arrives in the mailbox, controller initiates the tiny robot arm to pick up the item and moves it to scanner and initiates the scanner to scan the item. Controller then collects associated entities of the received mail item using OCR and sends a notification to the user. An associated entity includes sender name and address and other information on the face of the mail item. If there is no sender address in the mail item then controller realizes that the received mail item is junk/unwanted and sends it to shredder using robot arm for trash.

16 Claims, 5 Drawing Sheets

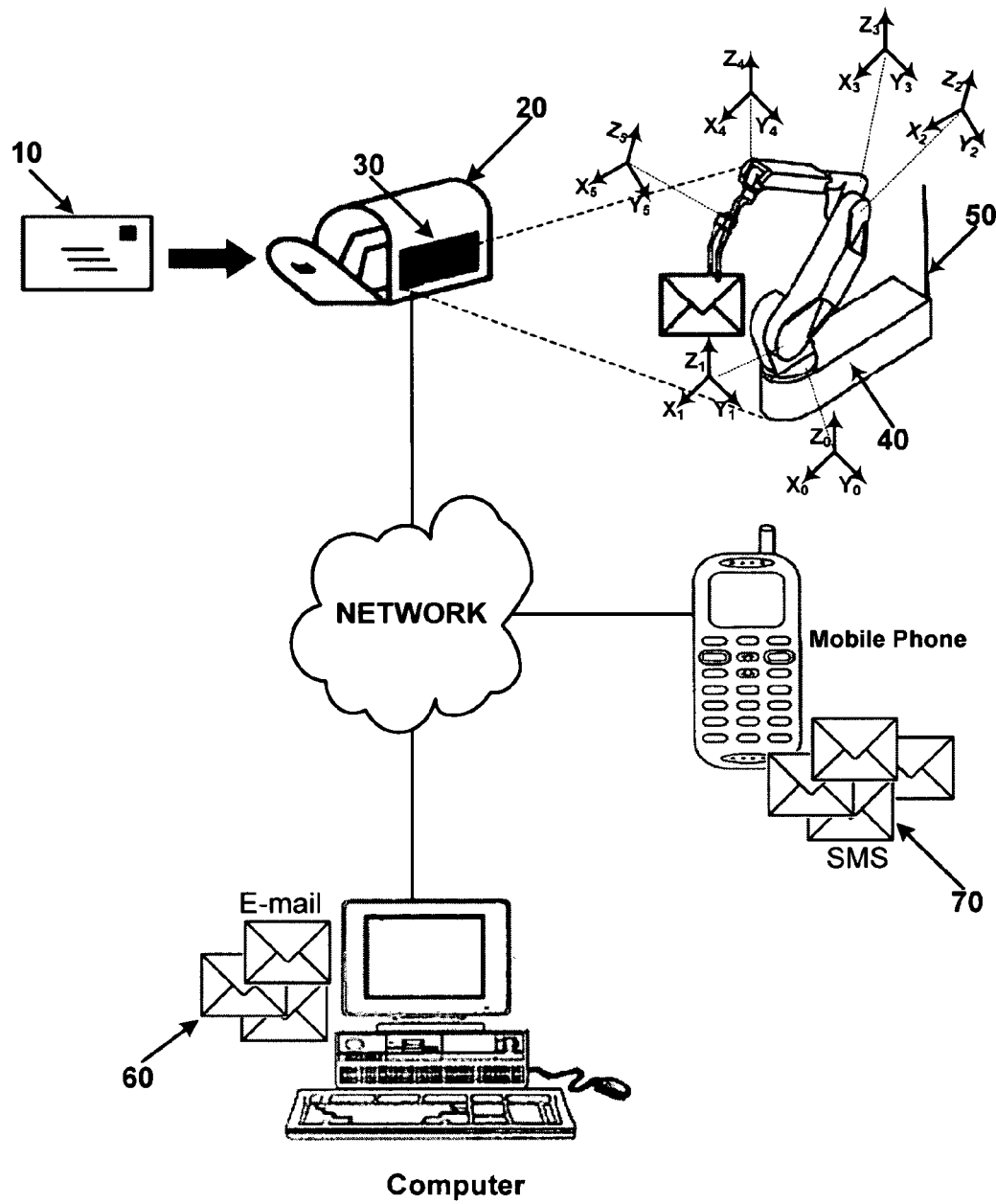
FIG. 1.a – PRIOR ART

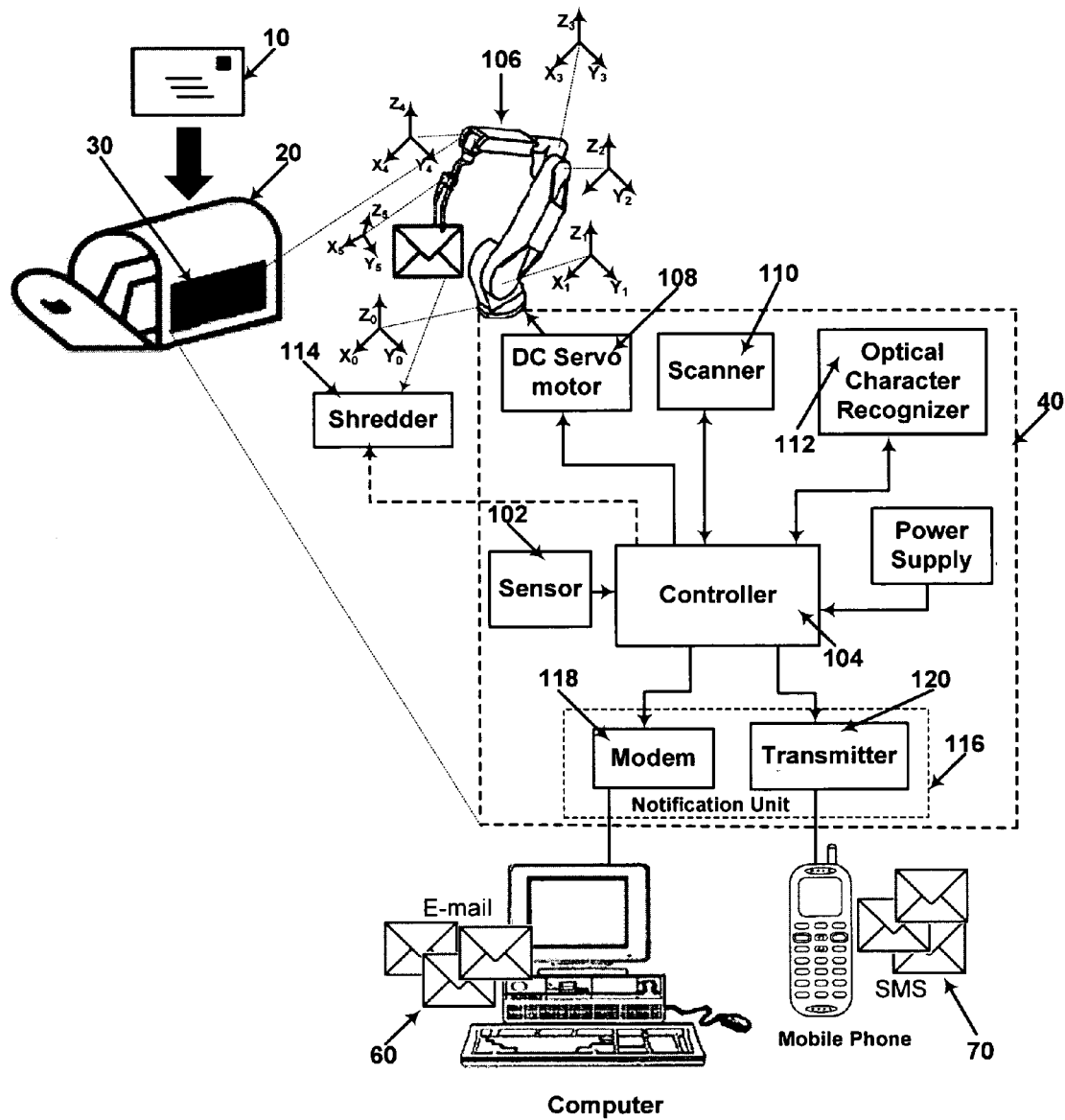
FIG. 1.b – PRIOR ART

METHOD AND SYSTEM FOR TRACKING AND PROCESSING ITEMS IN PERSONAL MAILBOX

FIELD OF THE INVENTION

The present invention relates generally to the item management system, and more particularly, to managing, tracking and automatically processing the received postal items in his/her personal mailbox.

BACKGROUND OF THE INVENTION

Personal Mail Boxes are the temporary storage location where postal delivery person drops the mail item to corresponding individual. But most of the individuals are not able to check their personal mailboxes due to forgetfulness, time constraint, laziness, long out-of-station travels. If they are not able to check their personal mailboxes regularly, the mail item count drastically increases by dumping of many mail items and spam mails (i.e., unwanted advertisements) in their mail boxes. Since the size of personal mailboxes is small the postal mail delivery person finds it difficult to deliver new postal items due to their personal mail box being full or lack of space. Also there is a possibility for necessary mail items to get lost within the stack of unwanted advertisements. Due to this reason, people could miss out an important mail item or/and not able to respond to mail item within an appropriate time like for example—credit card bills or electricity bills or responds to SSN office query etc.

In order to overcome such problems, there is a need for a system that automatically checks and provides notification to the user when he/she receives a mail item and also clears the inappropriate mail items. Such a system disclosed in U.S. patent application Ser. No. 11/694,751, by Michael D. Miles et al, filed Mar. 30, 2007, entitled as "ITEM MANAGEMENT SYSTEMS AND ASSOCIATED METHODS"—But such a system disclosed in U.S. patent application Ser. No. 11/694,751 requires manual effort, and is time consuming and costly for individuals and businesses.

Although there have been many advances in delivering postal mail over the Internet by manually receiving the mails in post office process it and send to the remote user, there has not been an apparatus or method that facilitate to scan and process the user's mails without requiring manual effort. Accordingly, the present inventor has developed a hand-held device that can process the received items by inducting the items, collecting the data about the items, including data about sender of each item, sending notifications to the user about items and also trash the unwanted received items.

SUMMARY OF THE INVENTION

In view of the foregoing disadvantages inherent in the prior art, the general purpose of the present invention is to provide an automated system configured to include all the advantages of the prior art, and to overcome the drawbacks inherent therein.

Therefore, an object of the present invention is to provide an automated process of imaging the received items, collecting the data about the received items, including data about sender of each item and sending notifications to the user about items. In certain embodiments, imaging the item can include imaging at least a portion of the item and providing that image to the user.

Another object of the present invention is to provide an automated system to easily manage mail items at the finger tips; avoiding unnecessary stops to the mailbox when there are only unwanted advertisements. Thus the present invention is handy.

Still another object of the present invention is to provide the user peace of mind by providing an immediate notification to respond or/and take necessary action for an important received mail items.

Still another object of the present invention to provide ability to integrate their postal mail into document management, CRM and other systems that they are already using on their day-to-day life.

In light of the above objects, in one aspect, the present invention provides an automated process of handling the receiving items. The present invention is capable of imaging received mail items, collecting the data about the mail items, sending notifications to the user about items and finally trash unwanted mail items. The present invention includes a tiny robot arm to pick-up the mail items inside the mail box, a controller operatively coupled to the scanner unit and the notification unit. In operation, the user mail box receives the mail item. Thereafter, the controller initiates the tiny robot arm to pick-up the item and initiates scanner to scan the cover page of received item. Using OCR unit, controller recognizes the sender information and sends a notification to the user with collected information about the received mail items.

In another aspect, the present invention provides an automated process of inspecting the received mail items in a portable electronic device, thereby making the system of present invention handy and comfortable to use.

These together with other aspects of the present invention, along with the various features of novelty that characterize the present invention, are pointed out with particularity in the claims annexed hereto and form a part of the present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

FIG. 1.*a* illustrates a first embodiment of prior art of the present invention.

FIG. 1.*b* illustrates the detailed operation of the present invention.

DETAILED DESCRIPTION

The exemplary embodiments described herein detail for illustrative purposes and are subject to many variations in structure and design. It should be emphasized, however, that the present invention is not limited to a particular handling the individual mail items, as shown and described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The terms "a" and "an" herein do not denote a limitation of quantity, but rather denote the presence of at least one of the referenced item.

The present invention discloses an automated process of handling the individual mail items, sending a notification to the user and take appropriate action for mail items. More specifically, the present invention is capable of imaging received mail items, collecting the data about the received items i.e., imaging at least a portion of the mail item and providing that image to the user, including data about sender of each item and sending notifications to the user about items.

Figure 4:
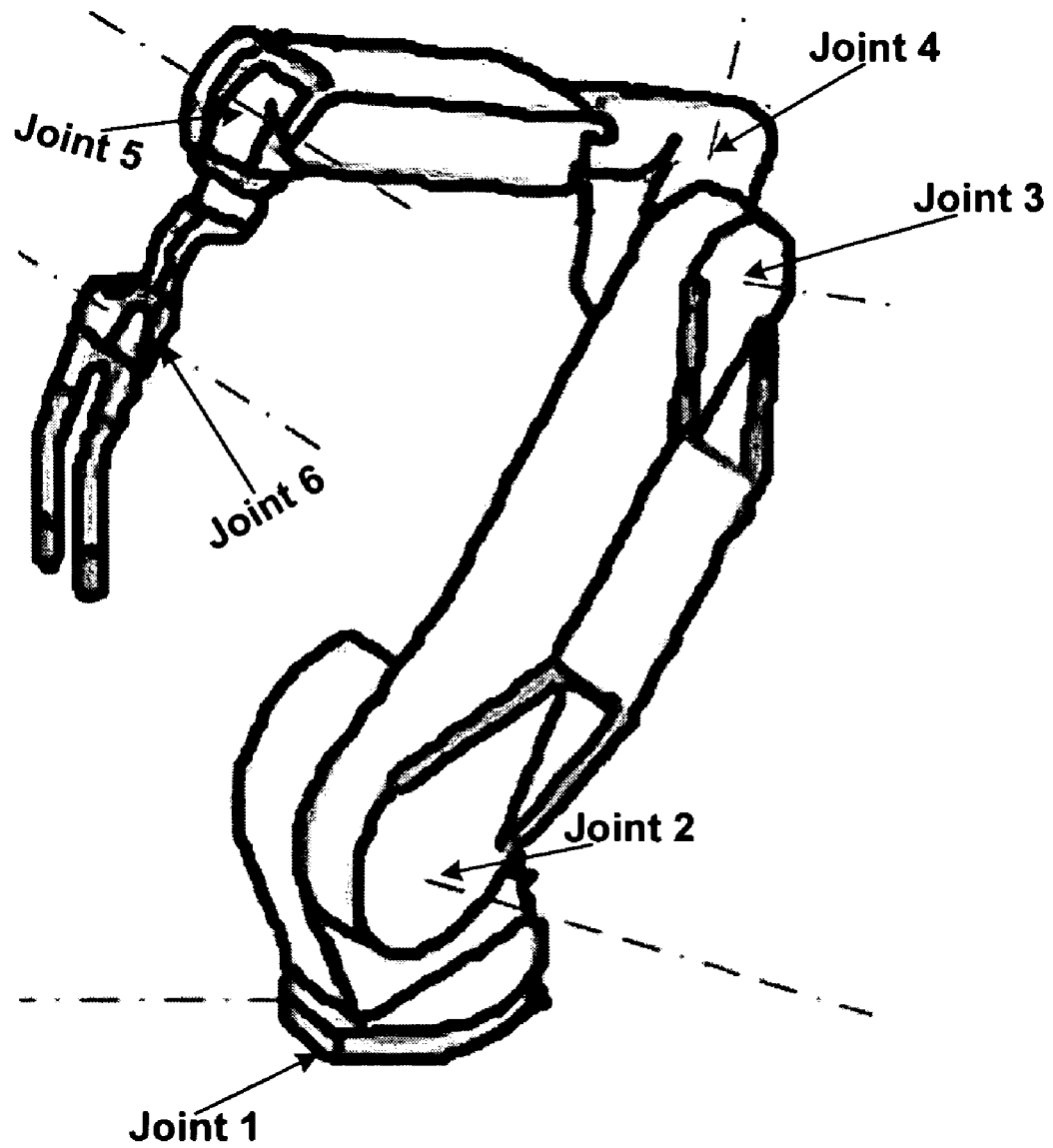
FIG. 4 illustrates the degrees of joint rotation of the tiny robot arm.

Referring to FIG. 1.*b*, a block diagram of the present invention 30, hereinafter referred to as system 30, is illustrated. The system 30 is composed of two separated components: The tiny robot arm 106 and controller apparatus 40. A tiny robot arm is the mechanical component of the present invention incorporating 6 degrees of freedom, each controlled by a tiny DC servomotor 108 & Controller 104. It is sufficiently flexible to perform a wide variety of tasks. Each member of the tiny robot arm 106 is connected to another member at a joint as shown in FIG. 4. At each joint passes one or more axes around which the members of the arm rotate. The members of the robot arm are shown in the FIG. 4. The robot arm members contain the various tiny servomotors and gear trains.

A tiny robot arm 106 is a programmable universal machine for assembly with 6 degrees of rotational freedom which is operatively connected to the controller and DC servomotor 108. It is an automatically controlled, reprogrammable, multipurpose manipulator programmable in six revolute axes. Typical operation of tiny robot arm 106 include pick-up and place the mail item 10, moving to shredder, and palletizing, all accomplished with high endurance, speed, and precision. The tiny robot arm 106 is configured as similar as x-y-z robots. This robot is programmed to faithfully carry out specific actions over and over again (repetitive actions) without variation and with a high degree of accuracy. These actions are determined by programmed routines in the controller that specify the direction, acceleration, velocity, deceleration, and distance of a series of coordinated motions.

Each member of the tiny robot arm 106 assembly is driven by a permanent-magnet DC servomotor 108 through its associated gear train and controller 104 program routine. The proper functioning of the present invention requires control of the position and velocity of each joint of the robot arm 106. The potentiometers, incorporated in the motor, are used to initialize the robot arm of the present invention, to establish its absolute position. The incremental encoders are mounted on the shaft of each motor and provide position change and velocity signals for the robot arm. Position change signals are read from the encoders, and velocity signals are calculated.

The DC servomotors for the major axes are equipped with electromagnetic brakes. These brakes are activated when power is removed from the motors, thereby locking the robot arm in a fixed position. This safety feature removes the risk of injury or damage that could result from the arm collapsing if power is accidentally removed. Power for the motors is supplied through the cable connecting the robot arm and the controller. Feedback signals from the incremental encoders and potentiometers are also carried by this cable.

As shown in FIG. 1.*b*, the controller apparatus of the present invention includes a controller 104, sensor 102, scanner 110, optical character recognizer 112 and notification unit 116. The controller 104 is the master component of the present invention. All signals to and from the tiny robot arm 106 pass through the controller 104 and are used by it to perform real-time calculations to control arm movement and position. Software is stored in the computer memory, located in the controller. The software interprets the operating instructions for the tiny robot arm 106 to pick-up and moves the mail item 10, and the controller 104 transmits these instructions from the computer memory to the arm. From incremental encoders and potentiometers in the tiny robot arm 106, the controller 104 receives data about arm position. This provides a closed loop control of arm motions.

The role of the sensor 102 of the apparatus is to monitor, detect and report to controller 104 when mail item 10 has been received. When triggered, it reports to the controller 104 and then the controller 104 decides on the next course of action, which is to initiate the tiny robot arm 106 to pick-up the received mail item 10. The present invention of apparatus uses the PIR (Passive Infrared) motion sensor 102. A PIR sensor detects motion by sensing the change in heat across its prism. Therefore when mail item 10 arrives into the mail box, the sensor 102 will immediately detect the mail item 10 presences.

The present invention provides an automated process of imaging received items, collecting the data about the received items, including data about sender of each item. In certain embodiments, the imaging process includes identifying one or more markings (e.g., an address, symbology, a code, or other information on the item) from the received item 10, and analyzing the markings to determine sender associated with the particular item 10. In one embodiment, an Optical Character Recognition (OCR) process is used to "read" the marking on the item so the item can be associated with the proper sender.

The Imaging process includes gathering information about individual received items. In one embodiment, the automated imaging process is used to gather data from the received item by imaging using scanner 110. This process includes scanning 204 and optical character recognition (OCR) 205. The scanning 204 process includes capturing an electronic (e.g., digital) image of a mail item 10. In selected embodiments where an OCR process 205 is going to be used, it is desirable to use a resolution of 240 dots per inch (DPI) or greater. The OCR process 205 can be used to locate a portion of a mail item image that contains data relevant to the notification process 209, 210 and translates at least part of that portion of the image into text.

After the scanning and OCR process is completed and the item 10 is associated with the correct sender, the controller 104 prepares the notification message that is sent to the user with information about received item 10. In one embodiment, the notification of each item in the controller is sending an SMS (Short Message Service) 70 to user's mobile phone. Additionally, in certain embodiments the controller 104 sends an electronic message 60 to the user using modem.

Figure 2:
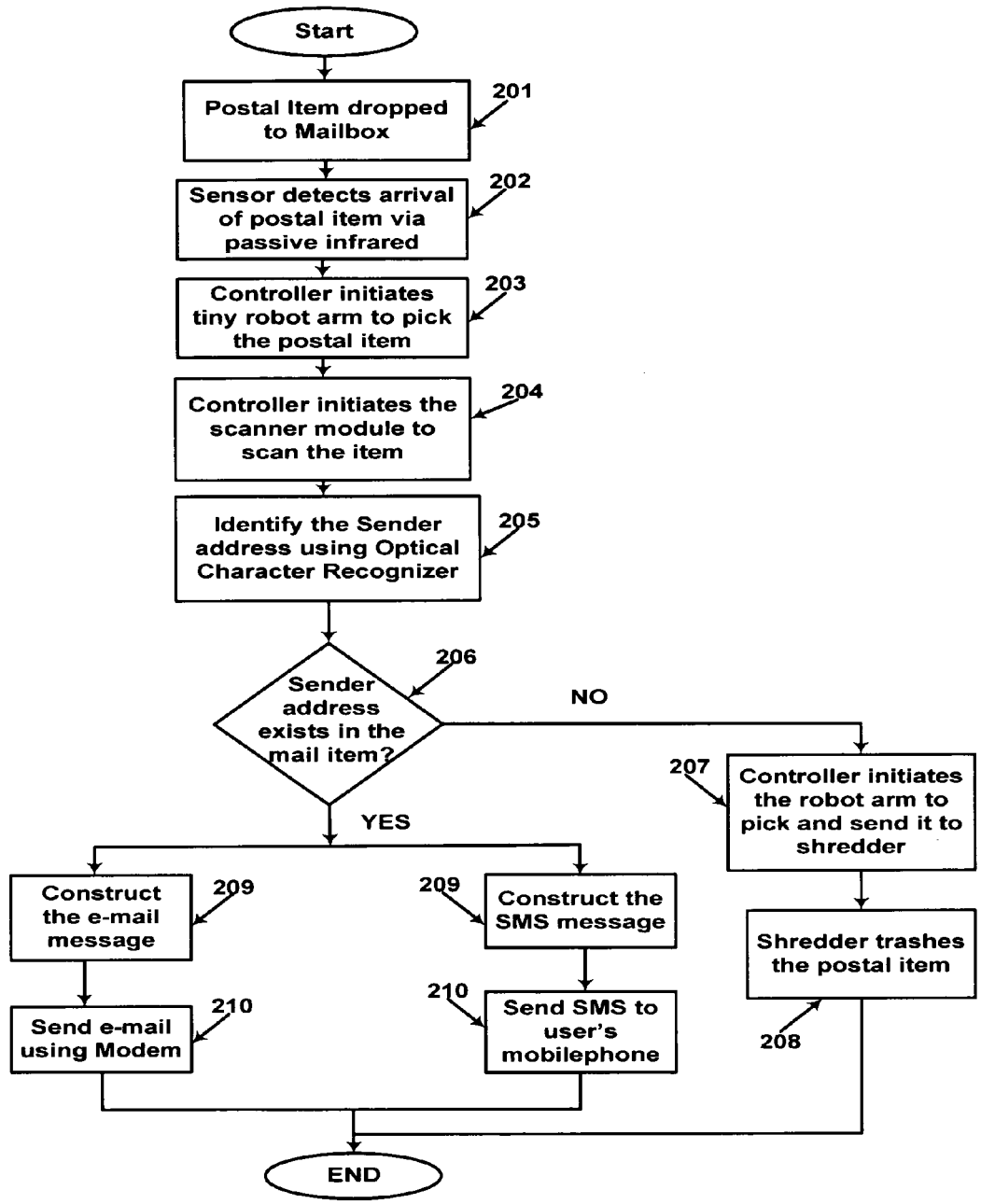
FIG. 2 illustrates the flowchart of the present invention.
Figure 3:
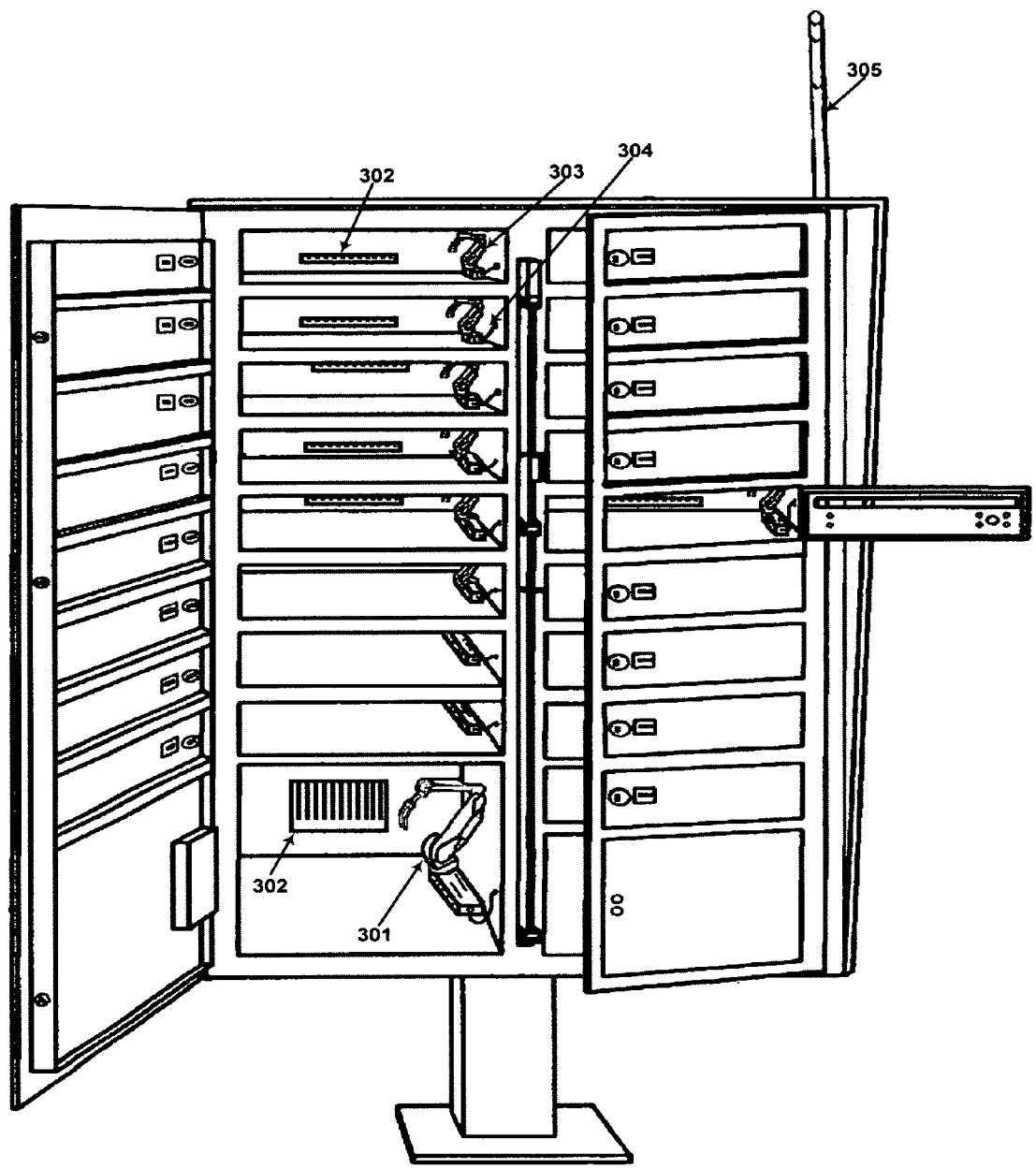
FIG. 3 illustrates on how the present invention suits in the typical personal mailboxes.

In Operation, as illustrated in FIG. 1.*a*, the user's mail box receives the mail item 10. The present invention resides in the user's mail box as sown in FIG. 1. The dimension of the present invention varies depending upon the size of mailboxes as shown in FIG. 3. Normally mailbox size varies by 3"×5.5", 5"×5.5", 11"×5.5", 11"×11", 22.5"×12", and Depth of most PO Boxes is 14.75". As shown in FIG. 3, the size of the apparatus 301 is different than the size of the apparatus 303; this is due to the smaller size of the mailbox. As shown in FIG. 1.*b* the sensor 102 of the present invention detects the presence of items in the mailbox and initiates the controller 104. Sensor 102 is operatively connected to a controller 104 and used to indicate the arrival of mail item via passive infrared. Controller 104 initiates the tiny robot arm 106 to pick up the received item 10 and instructs the scanner 110 to scan the cover page of the mail item 10. Using Optical Character Recognizer 112, controller 104 identifies the sender address and constructs a notification message to the user. If controller 104 is not able to identify the sender address then controller 104 determines the item as an unwanted item and sends it to shredder 114 using the tiny robot arm 106. As shown in FIG. 3, A shredder 302 is a mechanical device used to cut paper into chad, typically either strips or fine particles and fit in the individual mail box.

The present invention uses a shredder to destroy the user's unwanted documents. Controller 104 then sends the notification message to user as electronic mail 60 using modem 118 and sends an SMS (Short message service) 70 using mobile transmitter 120. As shown in FIG. 3, each mobile transmitter of the apparatus is connected to common antenna 305 to communicate to the network element in the mobile telephone network to deliver the notification about received items. In another embodiment, the antenna 50 is operatively connected to the apparatus 40 of the present invention as shown in FIG. 1.*a*. As shown in FIG. 3, a cable 304 is used to carry out SMS message signal from apparatus to antenna 305. User receives the SMS/electronic mail message regarding the items in the mailbox and depending on the importance of the items collects them at his/her convenient time.

As described above, the present invention discloses an automated process and/or system for managing received items. Accordingly, the system provides peace of my mind to the user by providing immediate response to user when mails arrive in the mailbox, thus enabling the user to respond to mails in timely manner. Moreover, the present invention provides the ability to integrate postal mail into document management, CRM and other systems that they are already using on their day-to-day life.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims of the present invention.

I claim:

1. An apparatus to process the received items in the individual personal mail box by imaging the received items, said an apparatus to collect the data about the received item, said an apparatus comprising:
    a tiny robot arm is a mechanical component to pick-up, place and palletizing the received items;
    a controller apparatus to pass signals to and from the tiny robot arm, imaging the received item, collecting the data about the received item and notify the user about received item, said a controller apparatus comprising:
        a sensor to monitor, detect and report to controller when an item has been received;
        a scanner for imaging at least a portion of the received item;
        an optical character recognizer to read and analyze the markings to determine the remote user is/are associated with the particular received item;
    a notification unit to send a notification about the received item, said notification unit comprising:
        a modem to connect to the internet to deliver the notification about received items;
        a transmitter to communicate to the network element in the mobile telephone network to deliver the notification about received items.

2. The apparatus according to claim 1, wherein imaging the item can include imaging at least a portion of the received item.

3. The apparatus according to claim 1, wherein collecting the data about received item means gathering data about sender address from the received item.

4. The apparatus according to claim 1, wherein item is an express mail or priority mail or first-class mail.

5. The apparatus according to claim 1, wherein item is a parcel post, bound printed matter.

6. The apparatus according to claim 1, wherein item is marketing pamphlets, unwanted advertisements, local booklets.

7. An apparatus to provide an instance of notifying to the user when any item received in his/her personal mail box.

8. The apparatus according to claim 6, wherein notifying to the user by e-mail.

9. The apparatus according to claim 6, wherein notifying to the user by SMS message.

10. A method to process the received items in the individual postal mail box without any manual effort, said method comprising the steps of:
    monitoring the individual mail box by passing infrared;
    triggering the controller to initiate the tiny robot arm when the individual mailbox received item;
    initiating the tiny robot arm to pick the received item;
    moving the received item in front of scanner;
    imaging at least a portion of the received item;
    collecting data about received item by reading and analyzing the markings to determine the remote user is/are associated with the particular received item;
    moving the particular received item to shredder if no marking are found or if markings are not associated with remote user information which is presented in the particular received item;
    preparing the notification message about said collected data of received item;
    sending a notification message to the user about received item.

11. The method according to claim 9, wherein item is an express mail or priority mail or first-class mail.

12. The method according to claim 9, wherein item is a parcel post, bound printed matter.

13. The method according to claim 9, wherein item is marketing pamphlets, unwanted advertisements, local coupon booklets.

14. The method according to claim 9, wherein imaging at least a portion of received item is scanning the cover page of received item.

15. The method according to claim 9, wherein sending notification message is sending an e-mail message to the user's e-mail address.

16. The method according to claim 9, wherein sending notification message is sending a Text message to user's cell phone about received items.

* * * * *